No. 879,973. PATENTED FEB. 25, 1908.
T. A. MARTIN.
ANIMAL SHEARS.
APPLICATION FILED SEPT. 6, 1907.
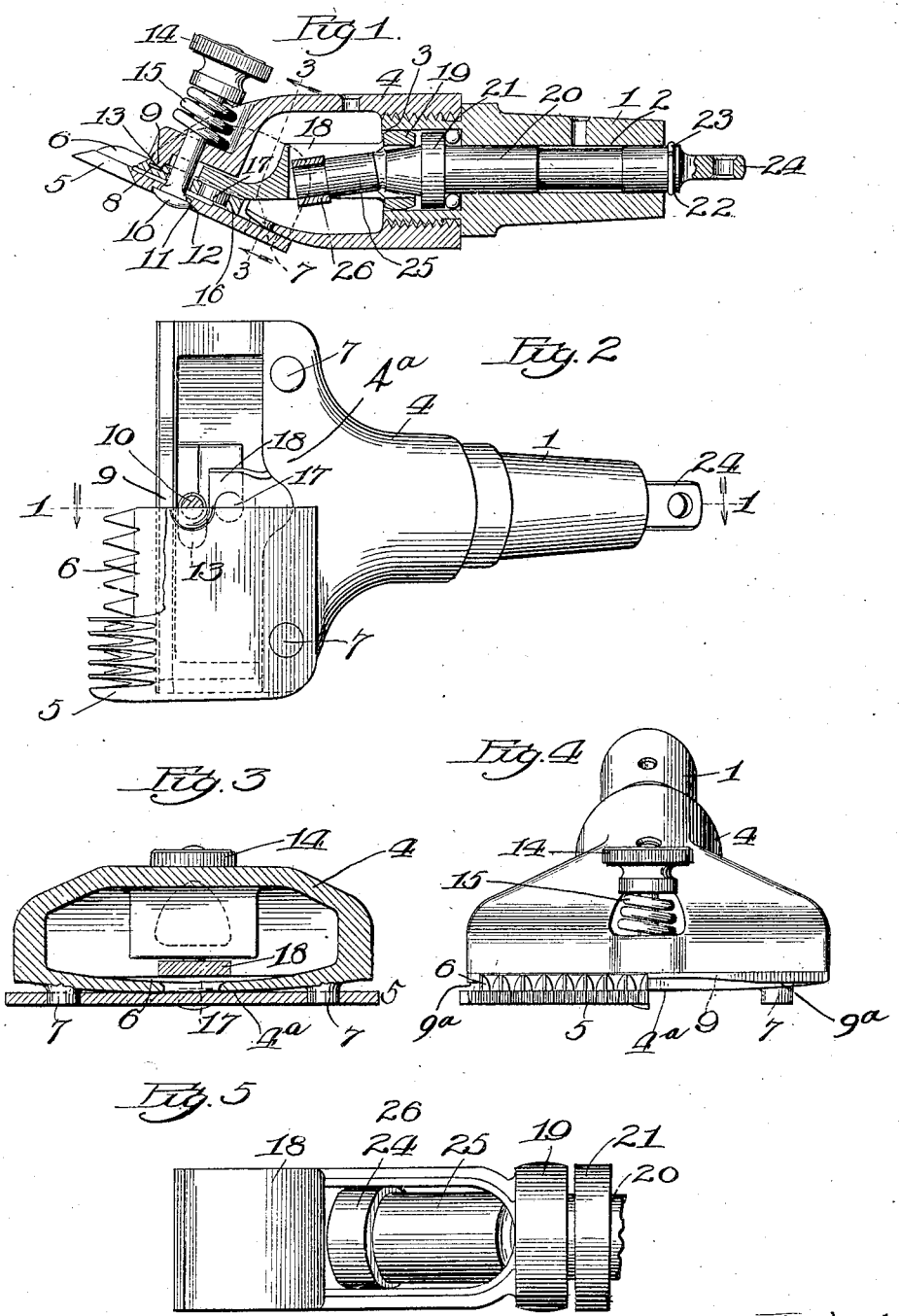

UNITED STATES PATENT OFFICE.

THOMAS ARTHUR MARTIN, OF CHICAGO, ILLINOIS, ASSIGNOR TO DAVIS-MARTIN COMPANY, OF CHICAGO, ILLINOIS, A CORPORATION OF ILLINOIS.

ANIMAL-SHEARS.

No. 879,973.        Specification of Letters Patent.        Patented Feb. 25, 1908.

Application filed September 6, 1907. Serial No. 391,544.

*To all whom it may concern:*

Be it known that I, THOMAS ARTHUR MARTIN, a citizen of the United States, residing at Chicago, in the county of Cook and State of Illinois, have invented certain new and useful Improvements in Animal-Shears, of which the following is a specification.

One of the objects of my invention is to produce an animal shears comprising few parts.

My invention also refers to other improvements in animal shears hereinafter set forth.

In the accompanying drawings, Figure 1 is a longitudinal central section of an animal shears embodying the features of my invention, taken on the dotted line 1 1 of Fig. 2. Fig. 2 is a plan view of the lower side of the shears, portions of the cutting comb and tightening bolt being broken away. Fig. 3 is a section of the forward portion of the shears taken on dotted line 3 3 of Fig. 1. Fig. 4 is a front end view of the shears with portions of the cutters broken away. Fig. 5 is an enlarged detail view of the operating lever and the forward end of the crank shaft illustrating the relations of said parts in operation.

The present embodiment of my invention belongs to that class of shears operated by a separate motor or drive. It will be apparent, however, that certain features of the invention are applicable to shears comprising any form of drive.

1 is a tapered shank piece provided with a longitudinal bearing opening 2, said bearing opening having an enlargement 3 at its forward end. A handle (not shown) may be slipped onto said shank. Screw-threaded to the forward end of said shank is a casing 4. Said casing is open at its lower forward end and is made sufficiently broad to provide bearings for both the stationary and movable cutters. The bearing face 4ª for the stationary cutter (see Figs. 3 and 4) is convex in form so as to provide only a short contact surface at the center. In this instance, both bearing faces are tilted with reference to the center line of the shank.

The lower stationary cutter or comb 5 upon which the movable cutter 6 operates is fixed to the lower face of the casing 4 by means comprising studs 7 on said casing, said studs preventing the comb 5 from turning, but not preventing said comb from being drawn against the cutter 6 as will appear hereinafter.

The movable cutter 6 has in its upper face a straight groove 8 which receives a guide rib 9 on the casing 4. The two cutters are held against the casing by means of the spring-held bolt 10. It will be apparent that the convex bearing surface 4ª for the stationary comb 5 on the casing 4, together with the bearing surface of the guide rib 9, constitute a three-point bearing which obviates the necessity for exact alinement in the bearing faces of the casing. The comb 5 is provided in this instance with a square opening 11 and a recess 12 to seat the bolt 10. The movable cutter is provided with an elongated opening 13 to accommodate its stroke, said opening being slightly larger than the bolt to allow a certain amount of play. The bolt extends through the casing 4 and, by means of a thumb nut 14 and spring 15 bearing on a depression in the casing, the cutters are firmly held in place and the pressure of the cutters upon each other regulated.

The projection or guide rib 9 is slightly cut away at the center so that any tightening of the thumb nut 14 would bring pressure on the outer ends of the cutters rather than at the center. The guide rib 9 thus provides two bearing portions 9ª (Fig. 4). At the center of the rear portion of the cutter 6 is a bearing opening 16 adapted to receive a stud 17 located on the forward end of the operating lever 18. The rear portion of the said operating lever is bifurcated and provided with a crowned bearing ring 19 which fits within the enlarged bearing opening 3 in the forward end of the shank 1. In the bearing openings 2 and 3, a crank shaft 20 is adapted to rotate, said crank shaft being provided with an annular flange 21. Between the flange 21 and the rear wall of the opening 3 is placed a series of bearing balls. The purpose of this ball bearing is to properly take care of the thrust occasioned by the contracting of the flexible shaft driving the shears, in starting. At the opposite end of the shaft 20, an annular groove 22 is provided into which an open spring ring 23 is placed, said spring ring being close enough to the end of the shank 2 to allow very little end play of the shaft in the shank. At the end of the shaft is an eye 24 arranged to be attached to any suitable driving means. A certain amount of play is allowed for the crown ring 19 within the enlarged opening 3 forward of the flange 21, as the upper cutter, having a straight line vibration, carries the ring back and forth within said opening. At the forward end of said crank shaft is a crank 25. In this instance, the crank 25 is integral with the crank shaft being formed by bending the forward portion of said shaft, and lies within the bifurcated end of the operating lever 18. In operation, it engages alternately either side of the bifurcated portion of the operating lever and produces a swinging motion of said lever. The crank portion is slightly smaller than the main shaft and is provided with an annular tip 26.

By reference to Fig. 2 it will be seen that the distance between centers of the comb teeth is less than the distance between centers of the teeth of the movable cutter. The teeth of the movable cutter, therefore, are at different positions with reference to the shear edges of their respective comb teeth, hence in operation the cutter teeth finish their cuts at different times, and a continuous shearing action is obtained. In use, the rear end of the crank shaft 20 is attached to any suitable drive means, such as a flexible shaft. The crank 25 operating against either side of the operating lever 18 causes the cutter 6 to be reciprocated.

It will be seen that the parts of this machine are few in number, simple in construction, and easily assembled. Wear upon the cutters is taken up and the pressure between them adjusted by means of the thumb nut 14.

As features of my invention may be embodied in shears of many designs, I do not wish to limit myself to the exact construction and mechanism herein illustrated.

I claim as my invention:

1. An animal shears comprising a shaft having a crank portion, a lever pivoted at one end upon said shaft and engaged by said crank portion, a cutter attached to the other end of said lever, and a stationary cutter.

2. An animal shears comprising a crank shaft, a lever engaged by said crank shaft, said lever being loosely pivoted at one end, a cutter pivotally connected with the other end of said lever, means for guiding said cutter and retaining it in place, and a stationary cutter.

3. An animal shears comprising a casing, a stationary cutter and a movable cutter secured to said casing, a rib and groove connection between the upper side of the movable cutter and the wall of the casing, a lever attached to said cutter, and a shaft having a crank connection with said lever.

4. An animal shears comprising a casing, a stationary cutter, means on said casing for preventing said cutter from turning, a movable cutter having a bearing upon said casing, spring-actuated means for pressing said cutters together and against the casing, and means for moving said movable cutter.

5. An animal shears comprising a supporting structure, a lever having an opening through its rear end, a crank shaft extending into said opening and having a crank portion therein, a cutter pivoted to the forward end of said lever, guide means on said supporting structure for said movable cutter, a stationary cutter, and means for holding said cutters together and to the structure.

6. An animal shears comprising a shank, a casing secured to the forward end of said shank, said shank having a longitudinal opening therethrough, said opening being enlarged at its forward end, a shaft mounted in the longitudinal opening of said shank, means on said shaft for preventing longitudinal movement thereof, a crank portion at the forward end of said shaft, a lever having an opening through its rear end, said shaft and said crank portion extending into said opening, the rear end of said lever being pivotally mounted upon said shaft within the enlarged forward end of the opening in said shank, a cutter attached to the forward end of said lever, a stationary cutter, and means for holding said cutters together and to the casing.

7. An animal shears comprising a casing, a movable cutter, guide means on said casing for said movable cutter, a stationary cutter having an engagement with said casing at one point, spring-actuated means for holding said cutters together and to the casing, and means for moving said movable cutter.

8. An animal shears comprising a shank having a longitudinal bearing opening therein, the forward end of said opening being enlarged, a casing attached to the forward end of said shaft, a guide rib on said casing, a movable cutter having a groove receiving said guide rib, studs on said casing, a stationary cutter having openings receiving said studs, a bolt extending through said cutters and yieldingly securing them to said casing, and means for moving said movable cutter.

9. An animal shears comprising a shaft, the forward portion of which is bent at a slight angle to constitute a crank; a lever having a bearing opening in its rear end and an opening forwardly of said bearing opening, said shaft extending into said bearing opening with its crank portion lying in the second mentioned opening; a cutter actuated from the forward end of said lever; and a stationary cutter.

10. An animal shears comprising a shank having an opening therein; a shaft mounted in said opening; a crank at the forward end of said shaft; a lever having a bearing opening in its rear end through which said shaft extends behind said crank; the rear end of said lever lying within the opening in said shank, said lever having an opening therein to receive said crank; a cutter pivoted to the forward end of said lever; means for guiding said cutter to move in a straight line, said lever being movable longitudinally of said shaft; and a stationary cutter.

11. An animal shears comprising a casing open at its lower forward end; a guide rib on said casing; a movable cutter having a groove receiving said guide rib; a stationary cutter; means on said casing engaging said stationary cutter; a spring-pressed bolt extending through said cutters and yieldingly securing them to said casing; and means for moving said movable cutter.

12. An animal shears comprising a casing having a convex bearing face thereon; a stationary cutter bearing upon said convex bearing face; means on said casing engaging said stationary cutter; a movable cutter bearing against said casing; and spring means for pressing said cutters together and against the casing.

13. An animal shears comprising a casing having three bearing portions; a stationary cutter bearing upon one of said bearing portions; a movable cutter bearing upon the other bearing portions; and means for pressing said cutters together and against the casing.

14. An animal shears comprising a casing having a convex bearing face thereon and a guide rib, the outer edge of said rib being cut away at its center; a stationary cutter bearing upon said convex bearing face; means on said casing engaging said stationary cutter; a movable cutter guided by said guide rib; and means for pressing said cutters together and against said guide rib.

15. In an animal shears, in combination, a casing; a movable cutter bearing upon a fixed portion of said casing; a stationary cutter; and a single spring means for pressing said cutters together and against said fixed portion of the casing.

16. An animal shears comprising a shank; a casing secured to the forward end of said shank, said shank having a longitudinal opening therethrough, said opening being enlarged at its forward end; a shaft mounted in the longitudinal opening of said shank; a crank portion at the forward end of said shaft; a lever having an opening in its rear end, said crank and said shaft extending into the opening in said lever, the end of said lever being mounted in the enlarged forward end of the opening in said shank; a movable cutter attached to the forward end of said lever; and a stationary cutter.

THOMAS ARTHUR MARTIN.

Witnesses:
L. L. MILLER,
GEORGE L. CHINDAHL.